T. RUSSELL,

Assignor to A. J. RUSSELL.

COMMODE CHAIR.

No. 10,049. Reissued Feb. 28, 1882.

Witnesses.
A. L. Whit-
U. H. Manning

Inventor.
True Russell
by Wright & Brown
Attys.

N. PETERS, Photo-Lithographer, Washington, D. C.

UNITED STATES PATENT OFFICE.

TRUE RUSSELL, OF BOSTON, MASSACHUSETTS, ASSIGNOR TO ABBIE J. RUSSELL, OF SAME PLACE.

COMMODE-CHAIR.

SPECIFICATION forming part of Reissued Letters Patent No. 10,049, dated February 28, 1882.

Original No. 250,396, dated December 6, 1881. Application for reissue filed January 20, 1882.

*To all whom it may concern:*

Be it known that I, TRUE RUSSELL, of Boston, in the county of Suffolk and State of Massachusetts, have invented certain Improvements in Commode-Chairs, of which the following is a specification.

This invention relates to a chair adapted for use as a commode in addition to its ordinary use as a chair; and it has for its object to provide an improved chair of such construction that it can be readily and conveniently adapted to either use; also, to enable the vessel or receptacle employed to be tightly sealed, so that no odors can escape therefrom.

To these ends my invention consists in the improvements which I will now proceed to describe and claim.

Figure 1:
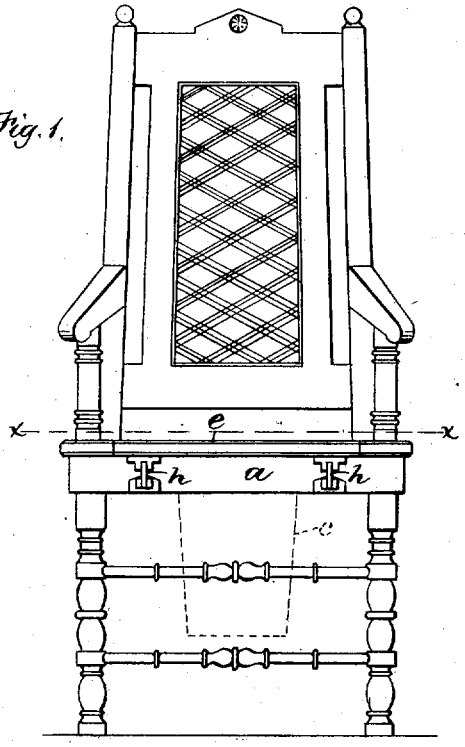
Figure 2:
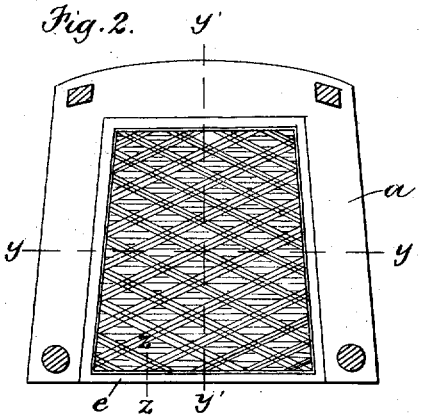
Figure 3:
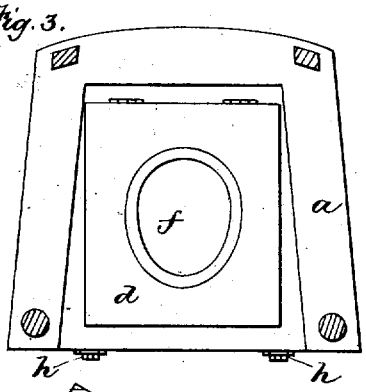
Figure 6:
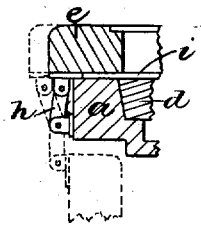
Figure 4:
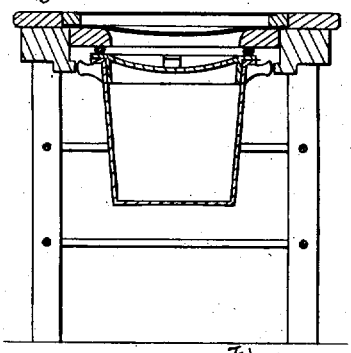
Figure 5:
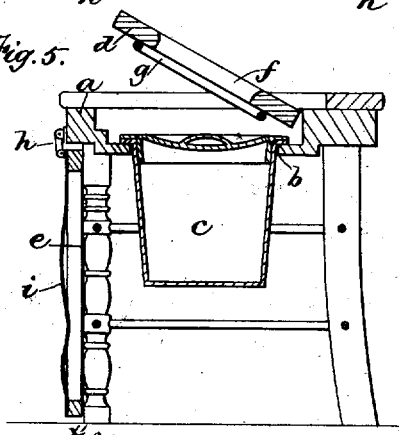
Figure 7:
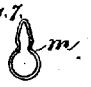
Figure 9:
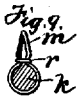
Figure 8:
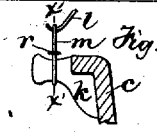

Of the accompanying drawings, forming part of this specification, Figure 1 represents a front elevation of a chair embodying my invention. Fig. 2 represents a section on line *x x*, Fig. 1. Fig. 3 represents a similar section with primary seat removed. Fig. 4 represents a section on line *y y*, Fig. 2. Fig. 5 represents a section on line *y′ y′*, Fig. 2, showing the primary seat removed and secondary seat raised. Fig. 6 represents a section, on an enlarged scale, on line *z z*, Fig. 2. Figs. 7, 8, and 9 represent details, the latter figure being a section on the line *x′ x′*, Fig. 8.

The same letters refer to the same parts in all the figures.

In carrying out my invention I construct a chair with a seat-frame, *a*, having in its lower portion an orifice, *b*, adapted to receive a flanged vessel, *c*, the flange of said vessel resting upon the portion of the frame surrounding the orifice. The vessel *c* is preferably tapering in form, and fitted closely to the orifice *b*.

*d* and *e* represent secondary and primary seats, supported by the seat-frame *a*. The secondary seat *d* is hinged to the frame *a*, above the vessel *c*, and is provided with an orifice, *f*, and with a rubber packing-strip, *g*, extending around said orifice on the under side of the seat, said packing being preferably composed of rubber tubing and adapted to bear upon the flange of the vessel, or upon the cover of the vessel, if a cover is provided. The primary seat *e* is connected to the front portion of the seat-frame by one or more link-hinges, *h*, which enable the seat *e* to be entirely removed from the frame *a* and swung under the same, out of the way of the sitter when the chair is in use as a commode, as shown in Fig. 5. The seating material of the seat *e* is preferably woven cane, with a suitable marginal frame.

*i* represents a sheet of flexible rubber cloth, attached at its borders to the under side of the seat *e*, so that it will sag downwardly at its center. Said sheet prevents the seat *d* from being seen, and is adapted to cover the orifice *f* of the seat *d* when the primary seat *e* is in place, as shown in Fig. 4, the sagging of the sheet *i* enabling it to rest upon the margin of the orifice *f* and to close the same completely.

When it is desired to use the chair as a commode the primary seat *e* is removed, as shown in Fig. 5, thus exposing the secondary seat. The weight of the secondary seat compresses the packing *g* and presses the flange of the vessel *c* upon the surface of the seat-frame, which surrounds the orifice *b* and supports said flange, the packing-strip *g* preventing the lateral escape of odors by pressing the cover of the vessel *c* tightly to its place when the cover is used, and by surrounding the mouth of the vessel in case the cover is not used. When the secondary seat *d* is occupied its weight is increased, and additional security is thus provided against the lateral escape of odors when the chair is in use as a commode. When the primary seat *e* is replaced in its normal position over the seat *d* the flexible sheet *i* covers and securely closes the orifice *f* of the seat *d* and prevents the upward escape of odors. It will be seen, therefore, that the interior of the vessel is entirely shut off from the outside air by the described construction and arrangement of parts, both when the chair is in use as a commode and afterward.

The link-hinges *h*, which connect the primary seat *e* to the seat-frame *a*, enable the primary seat to slide forward slightly on the seat-frame, as shown by the upper dotted lines in Fig. 6, so that the fingers may be inserted between the rear edge of the said primary seat and the proximate surface of the seat-frame, to enable the operator to lift the seat readily. When both of the seats are raised the vessel *c* may be readily removed.

The vessel *c* is preferably made of earthenware, and is provided with ears *k k*, projecting from its flange.

*l* represents a bail secured to said ears, preferably by being hooked into loops *m*, applied to the ears *k*, said loops being pear-shaped, as shown in Fig. 7, and adapted to be contracted upon the ears *k* by sliding rings *r*.

When the vessel *c* is removed the chair has nothing in its appearance suggesting its other use.

I claim—

1. In a commode-chair of the class described, the combination of the seat-frame *a*, having an orifice, *b*, a vessel, *c*, inserted in said orifice, and having a flange resting upon the portion of the frame surrounding said orifice, a secondary seat, *d*, hinged to the frame *a* and provided with a packing, *g*, adapted to rest on the flange of the vessel, said flange supporting the weight of the seat, which compresses the packing *g* and presses the flange upon the supporting-surface of the seat-frame, thereby preventing the escape of odors excepting through the orifice *f* of the secondary seat, and the primary open-work seat *e*, having on its under side a flexible sheet, *i*, adapted to cover the aperture in the secondary seat and prevent the latter from being seen, and also prevent the escape of odors through the opening in the seat *d*, as set forth.

2. In a commode-chair of the class described, the combination of the seat-frame *a*, having an orifice, *b*, a vessel, *c*, inserted in said orifice, and having a flange resting on the portion of the frame surrounding said orifice, a removable cover for said vessel, a secondary seat, *d*, hinged to the frame *a* and provided with a packing, *g*, adapted to rest on the cover of the vessel, said cover supporting the weight of the seat, which compresses the packing *g* and presses the cover upon the flange of the vessel and the flange upon the supporting-surface of the seat-frame, thereby tightly closing the vessel and preventing the escape of odors therefrom, as set forth.

3. The combination, in a commode-chair, of the seat-frame *a*, having an unobstructed space under its forward edge, the movable seat *e*, adapted to rest on said frame, and the link-hinges *h h*, connecting the seat *e* to the front of the frame, whereby the seat is enabled to be entirely removed from the seat-frame and swung into the unobstructed space under the forward edge of said frame, as set forth.

TRUE RUSSELL.

Witnesses:
C. F. BROWN,
A. L. WHITE.